United States Patent

Shafranovsky et al.

[11] 4,225,538
[45] Sep. 30, 1980

[54] ROTOR FILM MASS AND HEAT EXCHANGER

[76] Inventors: Alexandr V. Shafranovsky, ulitsa Molodezhnaya, 4, kv. 7, Balashikha Moskovskoi oblasti; Viktor M. Olevsky, Leningradsky prospekt, 75a, kv. 91, Moscow; Vladimir K. Chubukov, Komsomolsky prospekt,, Moscow; Jury A. Baskov, shosse Entuziastov, 156, kv. 20, Moscow, all of U.S.S.R.

[21] Appl. No.: 938,040

[22] Filed: Aug. 30, 1978

Related U.S. Application Data

[63] Continuation of Ser. No. 757,295, Jan. 6, 1977, abandoned.

[51] Int. Cl.² ............................................. B01D 47/18
[52] U.S. Cl. ................................ 261/92; 202/236; 202/158
[58] Field of Search .................. 165/93; 161/89, 90, 161/92

[56] References Cited

U.S. PATENT DOCUMENTS

| Re. 28,178 | 10/1974 | Jones | 261/149 |
|---|---|---|---|
| 574,683 | 1/1897 | Holmes | 261/92 |
| 1,213,042 | 1/1917 | Walker | 261/92 |
| 1,870,351 | 8/1932 | Wagner | 261/89 |
| 2,007,759 | 7/1935 | Harman | 261/89 |
| 3,151,043 | 9/1964 | Beattie et al. | 261/89 |
| 3,369,800 | 2/1968 | Takamatsu et al. | 261/88 |
| 4,038,353 | 7/1977 | Vladimirovich | 261/89 |

Primary Examiner—Carroll B. Dority, Jr.
Assistant Examiner—Theophil W. Streule, Jr.
Attorney, Agent, or Firm—Haseltine, Lake & Waters

[57] ABSTRACT

A rotor film mass and heat exchanger comprises a casing of a circular cross section with liquid and gas inlet pipe connections at one end and with liquid and gas outlet pipe connections at the other. Installed coaxially and rotatably in the casing is a shaft carrying reflux stages which are formed by bands bent as spirals diverging from said shaft and flanged towards the latter. The exchanger is provided with refluxing devices for moving the liquid from one reflux stage to another, said devices being made in the form of a spray collector secured to the inner surface of the casing and intended to receive the liquid thrown off from any one reflux stage; said spray collector is constituted by a circular trough embracing the reflux stage and having in its inner space a partition connected with the periphery of the reflux stage, arranged across the circular trough, and an overflow pipe whose inlet end communicates with the spray collector whereas its outlet end is brought to another reflux stage to which the liquid is to be delivered.

1 Claim, 6 Drawing Figures

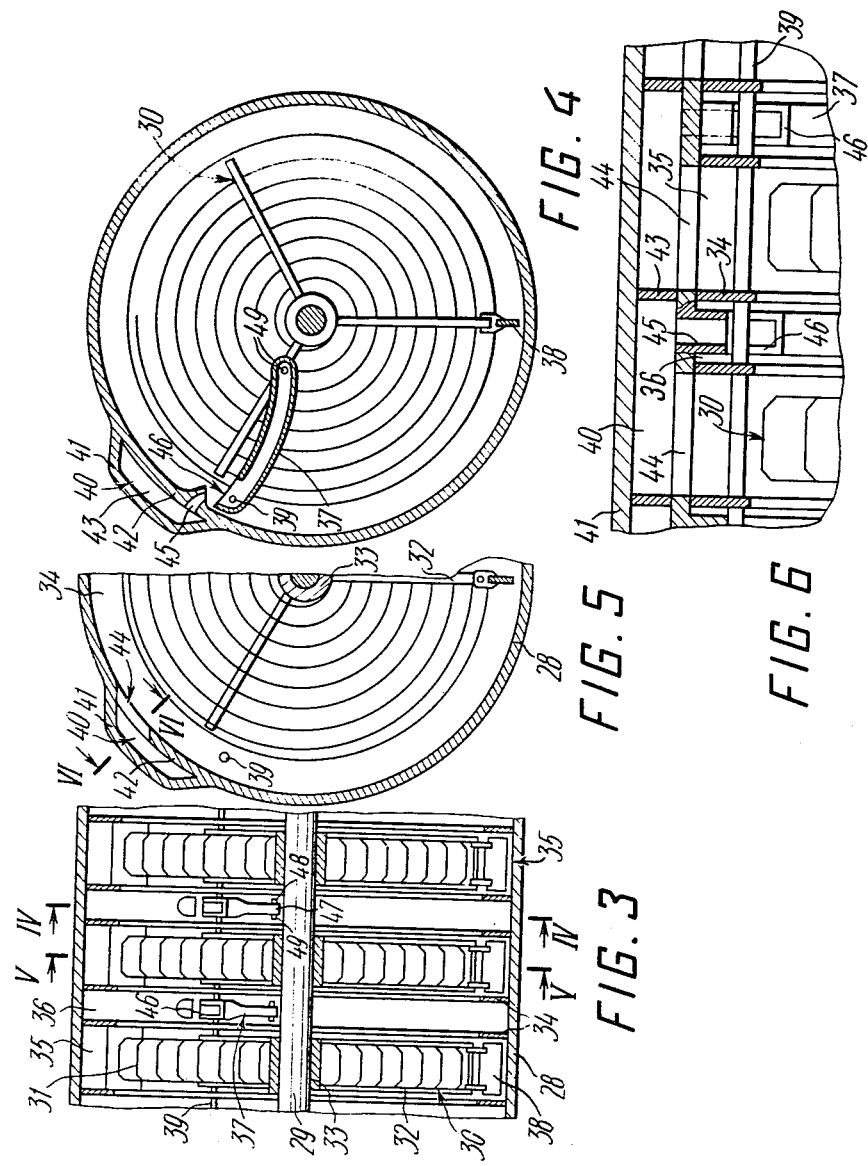

ROTOR FILM MASS AND HEAT EXCHANGER

This is a continuation of application Ser. No. 757,295, filed Jan. 6, 1977, and now abandoned.

The present invention relates to equipment for mass and heat exchange processes between gas and liquid, for example for rectification, absorption, chemisorption, wet purification of gases from dust, cooling and moistening of gases and more particularly it relates to rotor film mass and heat exchangers. The preferable field of utilization of the present invention is vacuum rectification of materials sensitive to elevated temperatures.

Known in the previous art is a rotor film mass and heat exchanger (see Author's Certificate No. 203621, USSR) comprising a casing of a circular cross section with liquid and gas inlet pipe connections at one end and liquid and gas outlet pipe connections at the other and a rotatable shaft installed coaxially in said casing and carrying reflux stages. The reflux stages are formed by bands in the form of spirals diverging from the shaft and flanged towards the latter. The known exchanger also comprises refluxing devices for conveying the liquid from one reflux stage to another. The refluxing device is constituted by a circular spray collector secured on the internal surface of the casing and intended to receive the liquid thrown from any one reflux stage, and an overflow pipe. The receiving end of the overflow pipe communicates with the spray collector while its outlet end is brought to another reflux stage.

During operation of the known rotor film mass and heat exchanger installed in a vertical position its shaft is set in rotation. The liquid is introduced into the casing from above through a pipe connection and falls on the uppermost reflux stage. Acted upon by centrifugal forces, the liquid spreads over the bands of the reflux stage in the form of a film and rushes from the centre of the reflux stage onto its periphery. From here the liquid is thrown into a circular spray collector secured on the casing wall. Then the liquid flows under gravity through the overflow pipe onto the underlying reflux stage. In this manner the liquid passes through the entire apparatus. The liquid thrown from the downmost reflux stage is discharged outside from the apparatus through a pipe connection secured at its lower end. The gas is delivered into the apparatus from underneath and discharged at the top through pipe connections in the casing. The gas crosses the reflux stages through gaps between the bands, coming in contact on the way with the liquid film covering said bands.

However, the known rotor film mass and heat exchanger has a number of disadvantages which impair the efficiency of mass and heat exchange.

One of the disadvantages lies in low reliability of its operation when the exchanger casing deviates from the vertical position for example during installation, so that the liquid tends to accumulate in the lowermost point of the circular spray collector. If the receiving end of the overflow pipe happens to be in the diametrically opposite place, i.e. on the highest point of the spray collector, the liquid will, at least partly, overflow the circular spray collector at the lowest point without entering the overflow pipe. This may disturb the flow of liquid from one reflux stage to the other, at least partly. Conversely, if the receiving end of the overflow pipe happens to be in the lowest point of the circular spray collector, the outlet end of the same overflow pipe will be located higher than its receiving end. Inasmuch as the liquid can flow through the overflow pipe only under the force of gravity, this will reduce the pipe throughout and will overfill the spray collector with resultant uncontrollable leakage of liquid.

Another disadvantage lies in the impossibility of recirculating the liquid on the reflux stage. The impossibility of returning the liquid thrown off a reflux stage to the same becomes obvious if we consider the design of the known exchanger. The liquid is prevented from returning to the reflux stage by the force of gravity. Recirculation of liquid on the reflux stage would ensure complete wetting of the stage even when very small amounts of liquid are supplied into the apparatus.

Still another disadvantage of the known rotor film mass and heat exchanger consists in difficulties involved in its assembly and disassembly. The overflow pipes are made in the form of radical chutes connected with the casing and arranged in the space between the reflux stages. Before removing the shaft with the reflux stages from the exchanger it becomes necessary first to remove all radical chutes whose number is often very large.

And one more disadvantage of the known rotor film mass and heat exchanger consists in an insufficiently developed heat-transfer surface. If the exchanger is used for chemisorption which is accompanied by liberation of large quantities of heat it often becomes necessary to abstract the liberated heat from the liquid.

In the known exchanger such heat abstraction can be achieved only through the casing walls which can be fitted with an external cooling jacket. Thus, the heat-transfer surface is limited by the wall area of the exchanger which often proves to be a limiting factor in raising its efficiency and output. On the other hand, arrangement of cooling coils in the circular spray collector proper will bring no noticeable increase in the heat transfer surface owing to a limited volume of the spray collector.

A still further disadvantage of the known rotor film mass and heat exchanger lies in the impossibility of its operation in a horizontal position.

Also known in the previous art is a rotor film mass and heat exchanger comprising a horizontal casing, a coaxial shaft carrying reflux stages, and circular spray collectors secured on the reflux stages, the inner space of the circular troughs communicating with the inlet ends of the overflow pipes whose outlet ends are brought to the adjacent reflux stages (see Author's Certificate No. 259822, USSR). However, these exchangers are efficient only at high shaft speeds because at low speeds, when the liquid runs slowly against the open inlet end of the overflow pipe, the liquid fails to flow from one reflux stage on the other.

An object of the present invention resides in providing a rotor film mass and heat exchanger which would ensure reliable flow of the liquid from one reflux stage to another even when the exchanger casing deviates from the vertical position.

Another object of the invention resides in providing a rotor film mass and heat exchanger which would ensure recirculation of liquid on the reflux stage.

Still another object of the invention resides in providing a rotor film mass and heat exchanger which would be easy to assemble and disassemble.

An additional object of the invention resides in providing a rotor film mass and heat exchanger with a widely developed heat exchange surface.

Besides, an object of the invention resides in providing a rotor film mass and heat exchanger which would be serviceable in a horizontal position at low shaft speeds too.

This is achieved by providing a rotor film mass and heat exchanger comprising a casing of a circular cross section with a liquid inlet pipe connection at one end and a liquid outlet pipe connection at the other, a gas inlet pipe connection at one end and a gas outlet pipe connection at the other, a rotatable shaft installed coaxially in said casing and carrying reflux stages formed by bands bent in the form of spirals diverging from the shaft and flanged towards the latter, and at least one refluxing device for moving the liquid from one reflux stage to another, said device being made in the form of a circular spray collector for receiving the liquid thrown from any one reflux stage and an overflow pipe whose receiving end communicates with the spray collector whereas its outlet end is brought to another reflux stage wherein, according to the invention, the spray collector is made in the form of a circular trough fitted around the reflux stage, the internal space of said trough incorporating at least one partition arranged across said trough and communicating with the periphery of the reflux stage.

Such a rotor film mass and heat exchanger functions reliably at any deviation of its casing from vertical. The partitions secured on the periphery of the reflux stages, brought into the space of the circular spray collector troughs and arranged across the troughs twist the liquid in the circular troughs. This originates centrifugal forces which press the liquid against the bottom of the circular troughs.

This pressure head of the liquid ensures its forced movement inside the overflow pipe. The forces acting on the liquid due to its twisting are stronger than the force of gravity. The shape of the liquid surface in the circular trough does not depend to any considerable extent upon the deviation of the exchanger axis from vertical just as the force pushing the liquid through the overflow pipe does not depend greatly on the effect of the forces of gravity.

When the casing of the rotor film mass and heat exchanger is located mainly vertically, it is practicable that the refluxing device should be additionally provided with a recirculating pipe whose inlet end communicates with the circular trough embracing the reflux stage and the outlet end is located higher than its inlet end and brought in at the top to the same reflux stage. Such a layout of the exchanger ensures raising of the liquid against the gravity forces in the refluxing device and, as a consequence, the liquid already thrown from the reflux stage returns to the same reflux stage. This ensures recirculation of liquid on the reflux stage. In this case the pressure head required for lifting the liquid in the recirculating pipe is originated under the effect of centrifugal forces applied to the liquid rotating in the circular trough.

It is good practice to provide the recirculating pipe with an adjusting valve. This will make it possible to control the amount of the recirculating liquid on the reflux stage without stopping the exchanger by a mere turning and adjusting element of the valve brought outside of the exchanger. A completely closed valve will stop recirculation of liquid on the reflux stage.

It is also desirable that the outlet ends of the overflow pipes should be located farther from the exchanger axis than the periphery of the reflux stages and that the partitions connected with the periphery of the reflux stages should be arranged one above the other and secured on a common spindle which is set parallel to the exchanger axis and fastened to the peripheral part of the reflux stages with a provision for rotation around its own axis. This simplifies the assembly and disassembly of the rotor film mass and heat exchanger. Before disassembly of the exchanger there is no need for removing the overflow pipes since they interfere no longer with removal of the exchanger rotor consisting of the reflux stages secured on the shaft. The partitions mounted on a common spindle and located in the internal spaces of the circular troughs during exchanger operations are withdrawn from the circular troughs before exchanger disassembly by turning their spindle and are pressed against the periphery of the reflux stages. Then the rotor can be readily taken out of the exchanger.

The pressure head of the liquid during exchanger operation will in this case make the spray discharged from the overflow pipe reach the middle of the reflux stage.

It is also desirable that at least one overflow pipe should include a surface heat exchanger located outside the apparatus. This heat exchanger can be used for transferring the surplus heat from the liquid during an exothermic reaction in the apparatus. In this case the pressure head required for pushing the liquid through the overflow pipe and the working channels of the surface heat exchanger is created by the positive twisting of the liquid in the circular trough. Thus, without altering the structural dimensions of the apparatus it becomes possible to increase at will its heat exchange surface required for cooling the liquid.

It is desirable that in the exchanger whose casing is located substantially horizontally the bottom of the circular trough should be provided on the outside with a chamber located above the casing axis, communicating with the inner surface of the circular trough through an inlet hole located in the upper part of the chamber and having in its lower part an outlet hole communicating with the receiving end of the overflow pipe, the cross-sectional area of the inlet hole exceeding considerably that of the outlet hole. The rotor film mass and heat exchanger of this design can work in a horizontal position when its shaft rotates at low speeds. In this case normal flow of the liquid from one reflux stage to another does not require a high additional pressure head of the liquid produced by twisting the liquid in the circular trough by the partitions secured to the periphery of the reflux stages. Owing to the provision of the chamber adjoining the circular trough and a large passage area through the inlet hole of the chamber the function of said partitions is confined only to "gathering" the liquid towards the inlet hole of the chamber. From the chamber the liquid flows farther only under the force of gravity.

It is also desirable that the outlet end of the overflow pipe should be bifurcated into pipe connections brought to two different reflux stages. Along with the transfer of liquid to the next reflux stage this will ensure partial returning of the liquid to the reflux stage from which the liquid has already been thrown off.

Now the invention will be described in detail by way of examples with reference to the accompanying drawings, in which:

FIG. 3 is a longitudinal section through another version of the rotor film mass and heat exchanger according to the invention, with a horizontal casing;

FIG. 4 is a section taken along line IV—IV in FIG. 3;

FIG. 5 is a section taken along line V—V in FIG. 3;

FIG. 6 is a section taken along line VI—VI in FIG. 5, enlarged.

Figure 1:
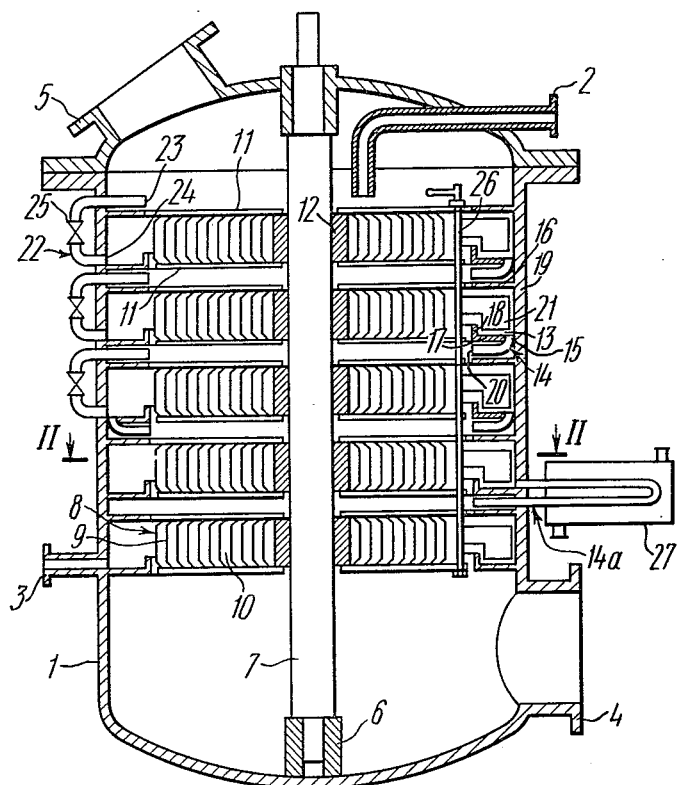
FIG. 1 is a longitudinal section through the rotor film mass and heat exchanger according to the invention.

The rotor film mass and heat exchanger comprises a casing a1 (FIG. 1) of a circular cross section, arranged vertically and provided with liquid and gas inlet pipe connections 2 and 4 at one end and with liquid and gas outlet pipe connections 3 and 5 of the other.

Installed coaxially on bearings 6 in the casing 1 is rotatable shaft 7 carrying reflux stages 8 formed by spiral bands 9 bent around the shaft 7 in the form of diverging spirals and flanged at the edges towards said shaft 7. The reflux stages cover the cross sectional area of the casing 1 and have gaps 10 (FIGS. 1, 2) between the spiral turns for the passage of the gas.

The bands 9 of the reflux stage 8 are interconnected by radial ribs 11 which are secured on the central mounting bushing 12 of the reflux stage 8.

The exchanger is provided with refluxing devices for moving the liquid from one reflux stage to another. The refluxing device comprises a spray collector in the form of a circular trough 13 fitted around the reflux stage and receiving the liquid thrown from said reflux stage 8, and an overflow pipe 14 (FIG. 1). The inlet end 15 of the overflow pipe 14 communicates with the circular trough 13 which has an upper shoulder 16 and a lower shoulder 17, the latter being provided with an upward-directed circular projection 18. The bottom 19 of the circular trough 13 is formed by a part of the side wall of the casing 1. The outlet end 20 of the pipe 14 is brought to another reflux stage 8. The inner space of the circular troughs 13 receives partitions 21 arranged across the troughs 13 and communicating with the periphery of the reflux stages 8. The refluxing devices in the upper part of the rotor film mass and heat exchanger are provided with additional recirculating pipes 22. The outlet ends of said pipes 22 are located above their inlet ends 24 which communicate with the circular trough 13 and are brought to the reflux stages 8 from the top. This ensures partial return of the liquid thrown from the reflux stages 8 back on the same reflux stages 8. The middle part of the additional pipes 22 is brought outside from the casing 1 and provided with an adjusting valve 25 which is capable of changing the amount of liquid recirculated on the reflux stages 8.

According to the invention, the outlet ends 20, 23 of the pipes 14, 22 are located farther from the exchanger axis than the periphery of the reflux stages 8. The partitions 21 are secured on a common spindle 26 installed parallel to the exchanger axis on the periphery of the reflux stages 8 with a provision for rotating around its own axis. The pressure head of the liquid created in the pipes 14, 22 by the rotating partitions 21 proves to be sufficient for throwing the liquid to the middle of the reflux stage 8. For withdrawing all the partitions 21 from the inner spaces of the circular troughs 13 it is enough to lift the shaft 7 with the reflux stages 8 a little and to turn the spindle 26 to a position in which the partitions 21 are withdrawn from the troughs 13 and pressed against the periphery of the reflux stages 8 (as shown by dotted lines in FIG. 2). Now the shaft 7 complete with the reflux stages 8 can be easily taken out of the exchanger casing 1.

The system of overflow pipes 14a (FIG. 1) located in the lower part of the exchanger includes surface heat exchangers 27 located outside the apparatus. They abstract surplus heat from the liquid in case of exothermic reactions in the exchanger. The additional resistance offered by the surface heat exchanger 27 to the flow of liquid from one reflux stage 8 to another is overcome due to twisting of the liquid in the circular trough 13 by the partition 21 and due to the creation of the additional pressure head of the liquid.

In another version of the rotor film mass and heat exchanger according to the invention the casing 28 (FIG. 3) of the exchanger is oriented substantially horizontally and provided with liquid inlet and gas outlet pipes at one end and with gas inlet and liquid outlet pipes at the other (the pipe connections are not shown in the drawing).

The shaft 29 mounted coaxially with the casing 28 carries reflux stages 30 made from flanged bands 31 twisted spirally around the shaft 29. The bands 31 are fastened by radial ribs to the central mounting sleeve 33 of the reflux stage 30. The internal surface of the casing 28 is provided with lateral circular partitions 34 which form, together with the wide walls of the casing 28, circular troughs 35 embracing the periphery of each reflux stage 30. The circular troughs 35 may be made separately from the exchanger casing 28 and installed in it with a small clearance (not shown in the drawing). In the exchanger version shown in FIG. 3 the bottom of the trough 35 coincides with the wall of the casing 28. Located between the troughs 35 are compartments 36 accommodating overflow pipes 37 (FIGS. 3, 4). Partitions 38 entering the circular troughs 35 (FIG. 3) are articulated to the ribs 32 on the periphery of the reflux stages 30. The overflow pipes 37 are mounted on a common spindle 39. When disassembling the exchanger the spindle 39 is turned so as to sink the pipes 37 into the compartments 36 after which the shaft 29 complete with the reflux stages 30 can be easily taken out of the exchanger. Obviously, the partitions 38 should for this purpose be first turned towards the reflux stages 30. This is accomplished by turning the shaft 29 to a position in which all the articulated partitions 38 sag towards the reflux stage 30 under their own weight.

A chamber 40 (FIGS. 5, 6) adjoins the bottom of the circular trough 35 on the outside. Said chamber is located above the axis of the casing 28 (FIG. 5) and is limited by a wall 41 on the top, wall 42 at the bottom and side walls 43 (FIG. 6) which limit the chamber 40 in the longitudinal direction relative to the casing 28 (FIG. 5). The side walls 43 (FIG. 6) of the chamber 40 are arranged in such a manner that the width of said chamber is larger than that of the circular trough 35 and a part of the chamber 40 is located opposite the intermediate compartment 36. The upper part of the chamber relative to the exchanger axis has a wide inlet hole 44 (FIGS. 5, 6) for communication with the inner surface of the circular trough 35 (FIG. 6). The lower part of the chamber is provided with an outlet hole 45 (FIG. 4) of a smaller diameter for communication with the inlet end 46 of the overflow pipe 37. The outlet hole 45 of the chamber 40 faces the intermediate compartment 36 (FIG. 6). Thus, the inlet end 46 (FIG. 3) of the overflow pipe 37 communicates through the chamber 40 (FIG. 6) with the inner space of the circular trough 35 embracing the reflux stage 30. The outlet end 47 (FIG. 3) of the overflow pipe 37 is divided into two pipe connections 48, 49 directed onto different reflux stages 30. If there is no need in recirculation of liquid on the reflux stages 30, the pipe connection 49 is either plugged or not provided at all.

Figure 2:
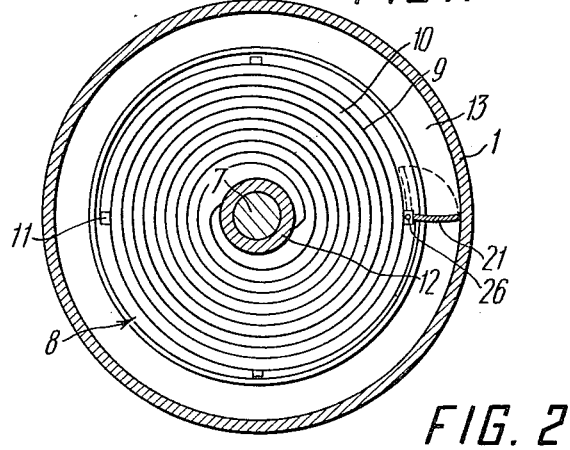
FIG. 2 is a section taken along line II—II in FIG. 1.

The rotor film mass and heat exchanger in the version shown in FIGS. 1, 2 functions as follows.

The shaft 7 (FIG. 1) carrying the reflux stages 8 is rotated by a drive (not shown in the drawing). The liquid is delivered through a pipe connection 2 onto the uppermost reflux stage 11. Acted upon by the centrifugal forces, the liquid moistens the bands 9 of the reflux stage 8 and is then thrown off from its periphery into the circular trough 13 which embraces said reflux stage 8. The liquid is accumulated and then twisted in the circular trough 13 by the partition 21 connected with the periphery of the reflux stage 8. This creates a rotating liquid ring in the circular trough 13, said ring pressing on the bottom 19 of the trough 13.

The liquid is forced under pressure into the overflow pipe 14 and discharged in the form of a spray from the outlet end 20 of the pipe 14 into the space between the reflux stages 8; then it falls under the force of gravity onto the underlying reflux stage 8. Part of the liquid rises upward through the additional overflow pipe 22 and returns to the initial reflux stage 8. The two lowermost reflux stages 8 have no liquid recirculating pipes. The liquid leaving the last reflux stage 8 but one passes through the surface heat exchangers 27 located outside the apparatus and returns into said apparatus, giving off the surplus heat in said heat exchangers 27. The surface heat exchangers 27 are required in those cases when the chemical interaction between gas and liquid (chemisorption liberates too much heat which must be abstracted. An example of such processes can be constituted by interaction of nitrogen oxides with water at room temperature under pressure and by the resultant formation of nitric acid.

The gas is introduced into the heat exchanger through the pipe connection 4 and discharged therefrom through the pipe connection 5. In the gaps 10 between the reflux stages 8 the gas comes in contact with the liquid film.

The version of the heat exchanger illustrated in FIGS. 3-5 functions as follows. The liquid is thrown from the rotating reflux stage 30 (FIG. 3) into the circular trough 35 and drips down into its lower part. During the rotation of the reflux stage 30 the partitions 38 gather the liquid and move it along the trough 35 towards the inlet hole 44 (FIG. 5) of the chamber 40. The liquid enters through the hole 44 into the chamber 40 and leaves it through the outlet hole 45 (FIG. 4) flowing into the inlet end 46 of the overflow pipe 37. Through the pipe connections 48, 49 (FIG. 3) the liquid is discharged in a spray onto the reflux stages 30. Part of the liquid flowing out through the pipe connection 49 returns to the same reflux stage 30 from which it has been gathered. The other part of the liquid is delivered through the pipe connection 48 onto the other reflux stage 30. Thus, the liquid moves in the heat exchanger from one of its ends to the other. The gas moves in the apparatus in the opposite direction and contacts the liquid film in the gaps between the bands 31.

What we claim is:

1. A rotor film mass exchanger comprising: a casing of a circular cross section arranged substantially horizontally and having liquid and gas inlet and outlet pipe connections; a shaft installed rotatably in said casing coaxially with the latter; reflux stages secured to said shaft; bands forming said reflux stages, bent in the form of spirals diverging from said shaft and flanged toward the latter; refluxing devices for moving the liquid from one of said reflux stages to another; a spray collector for each of said refluxing devices formed as a circular trough secured to the inner surface of the casing, embracing the reflux stage, said collector being adapted to receive the liquid thrown off from said reflux stage; at least one partition for each of said refluxing devices, said partition being connected with the periphery of the reflux stage, and across it; a wall means defining a longitudinal chamber for said refluxing devices, a side wall connected to said wall means, the chamber adjoining the bottom of said circular trough on the outside being disposed higher than the casing axis and provided at the top with an inlet hole for communication with the inner space of the circular trough; and an outlet hole in the lower part, said inlet hole of the chamber being larger than its outlet hole; an overflow pipe in each of said refluxing devices; said inlet end of said overflow pipe communicating with said outlet hole of the chamber; and the outlet end of said overflow pipe being at the reflux stage to which the liquid is to be delivered.

* * * * *